United States Patent [19]

Musselman et al.

[11] 4,014,727

[45] Mar. 29, 1977

[54] CORRUGATING ADHESIVE COMPOSITION

[75] Inventors: Camillus B. Musselman, Chesterfield; Edward M. Bovier, St. Louis County, both of Mo.

[73] Assignee: Anheuser-Busch, Incorporated, St. Louis, Mo.

[22] Filed: July 18, 1975

[21] Appl. No.: 597,396

Related U.S. Application Data

[60] Division of Ser. No. 477,326, June 7, 1974, Pat. No. 3,912,531, and a continuation-in-part of Ser. No. 264,868, June 21, 1972, abandoned, and a continuation-in-part of Ser. No. 368,109, June 8, 1973, abandoned.

[52] U.S. Cl. .............................. 156/205; 106/213; 156/336
[51] Int. Cl.² .......................................... B31F 1/22
[58] Field of Search .......... 156/208, 209, 210, 205; 106/210, 213

[56] References Cited

UNITED STATES PATENTS

| 3,155,527 | 11/1964 | Mentzer | 106/210 |
|---|---|---|---|
| 3,355,307 | 11/1967 | Schoenberger | 106/213 |
| 3,912,531 | 10/1975 | Musselman et al. | 106/213 |

Primary Examiner—Theodore Morris
Attorney, Agent, or Firm—Gravely, Lieder & Woodruff

[57] ABSTRACT

This disclosure relates to an adhesive composition for use in the manufacture of corrugated board and its preparation. The adhesive is prepared by using a thin boiling or modified waxy variety starch of fluidity of 25 or greater as a component in the gelatinized carrier portion of the adhesive. This produces a high solids carrier which results in a final adhesive of good stability whose use enables corrugated board to be produced at faster than normal rates. This adhesive is particularly useful to increase production rates of heavy weight and multiwall board.

7 Claims, 1 Drawing Figure

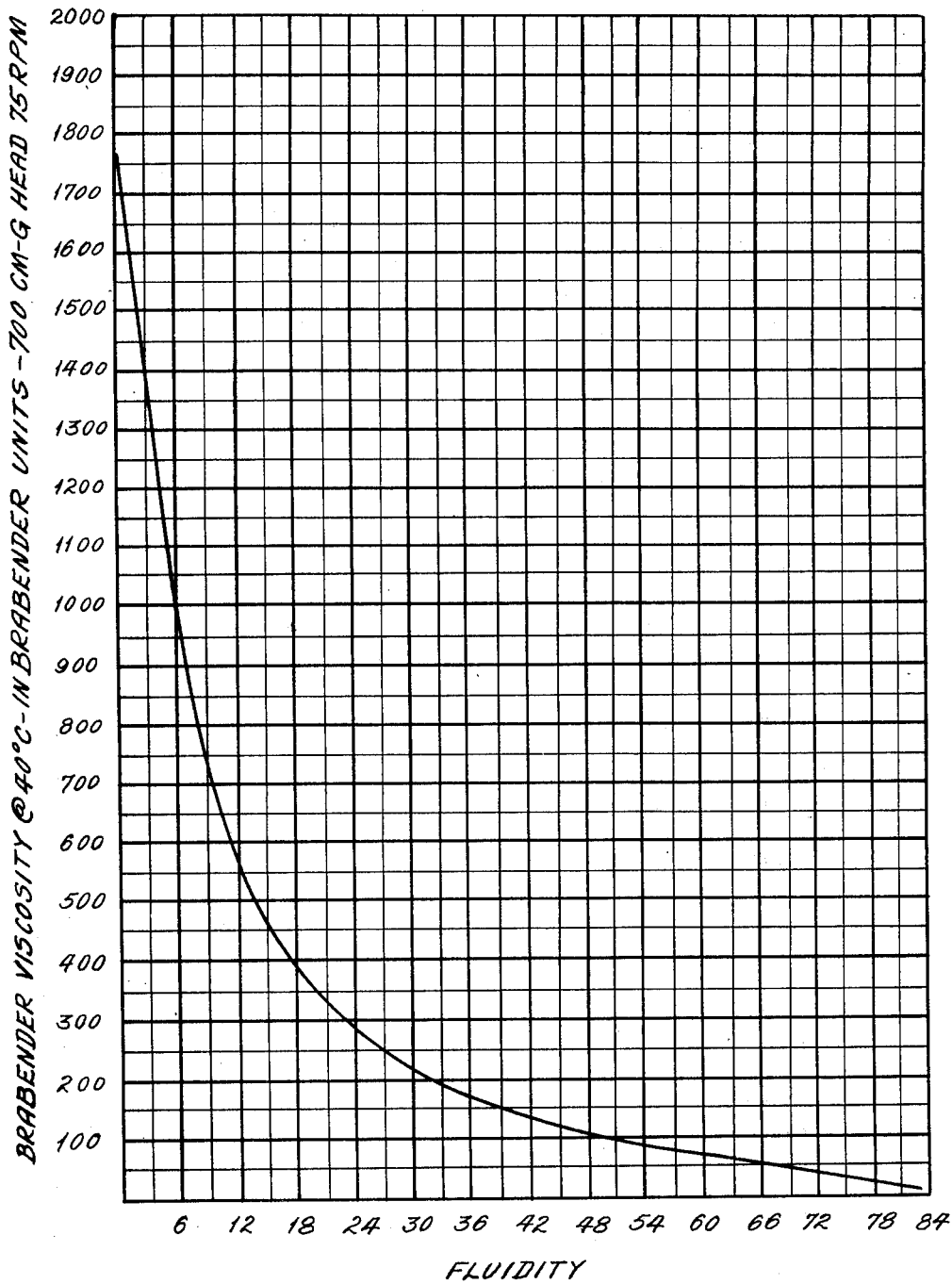

CORRUGATING ADHESIVE COMPOSITION

REFERENCE TO PRIOR APPLICATIONS

This is a division of application Ser. No. 477,326, filed June 7, 1974 now U.S. Pat. No. 3,912,531.

This application is a continuation-in-part of application Ser. No. 264,868, filed June 21, 1972 (now abandoned), and co-pending application Ser. No. 368,109, filed June 8, 1973 (now abandoned).

BACKGROUND OF THE INVENTION

The use of corrugated paperboard for packaging has increased tremendously in the last several years. Accompanying this increased usage has been the demand for stronger and more specialized products to withstand more rigorous conditions. This demand has been met by the corrugated board industry by furnishing multiwall and heavy weight corrugated paperboard.

However, when such products are manufactured by the corrugators, the production rate is much lower than when single faced or doubled faced paperboard is being produced. Thus, the equipment is operating much less efficiently when such products are being made. The vast majority of corrugating operations are carried out using starch-based adhesives to glue the various plies of paper or paperboard together. Such a standard corrugating adhesive is usually made by first cooking a portion of the starch with alkali to form a gelatinized phase called the carrier, which is then blended with uncooked starch (the raw portion). The carrier serves as a suspending agent for the uncooked starch. Most standard starch-based corrugating adhesives utilize unmodified starches for the carrier and raw portions. However, the use of slightly acid modified starches having a fluidity in the 4–10 range has been practiced as set forth in the patent of Merle J. Mentzer assigned to Corn Products Co., bearing U.S. Pat. No. 3,155,527. These adhesives require heat to gelatinize the raw starch to activate it as a bonding agent and to remove the water from the adhesive film in order for the plies to adhere to each other. When making multiwall board or board having especially heavy liners, the heat transfer rate to the adhesive is reduced substantially by the insulating effect of the paper.

It is the principal object of this invention to provide an adhesive composition which allows the production of multiwall and heavy weight corrugated paperboard at greater rates than presently attainable.

SUMMARY OF THE INVENTION

This invention relates to the preparation of an adhesive composition having a modified waxy starch of greater than 25 fluidity in the gelatinized solids of the carrier. This adhesive allows for faster than presently attainable speeds in the production of corrugated board in general, and multiwall and heavy weight corrugated board in particular.

DETAILED DESCRIPTION

The composition is prepared by using a waxy variety starch as a component of a high solids carrier in a starch-based corrugating adhesive formulation.

The waxy variety starch can be derived from waxy maize, waxy sorghum, or any species yielding a high (95–100%) amylopectin content starch. A waxy variety starch is used because this generic type, when gelatinized, does not set back or congeal as most other varieties do.

The waxy starch must be modified to make it less viscous so that the cooked solids portion can be increased without affecting the viscosity of the finished adhesive. Such chemical treatments include acid-modification, oxidation, enzyme treatment, chemical derivatization, e.g., starch ethers or starch esters, and combinations thereof. Also, modified includes thermal modifications, such as dextrinizing and autoclaving. The waxy starch is modified to a fluidity of 25 or greater.

The modified waxy starch has the following physical and chemical characteristics:

Inherent viscosity of 0.2 to 2 deciliter/gram at 77° F. and 0.5% concentration as described in Standard Analytical Methods of the Corn Industries Research Foundation.

Solubility of 0.1% to 100% at 77° F.

Gelatinization temperature of 75° F. to 180° F.

Alkaline fluidity of 25 to 90 mls. measured at 25° C as described in "Chemistry and Industry of Starch" 2nd edition, R. W. Kerr, Academic Press N.Y., p. 133.

It is critical that the waxy starch have a fluidity of at least 25 as shown in the following Table I where Brabender viscosity is tabulated for waxy starches of various fluidity. This viscosity data at 40° C. is plotted against fluidity in the accompanying Figure and the slope of the curve shows a sharp break at a fluidity between 20 and 25. Table II shows the relationship of the fluidity range and the slope of the curve in that range. Thus, it is clear that at a fluidity of 20 or below a slight change in fluidity has a great effect on the waxy starch viscosity, whereas at a fluidity of 25 or higher, changes in fluidity result in very slight changes in viscosity of the waxy starch.

TABLE I

| | Brabender Data - 15% D.S., in Brabender Units - 700 cm.-g. Head, 75 RPM | | | | | | | |
|---|---|---|---|---|---|---|---|---|
| Sample | Fluidity | %H$_2$O | Gel ° C. | Peak | 92.5° C. | 20 min. | 40° | 25° C. |
| 1 | 0 | 10.6 | 68 | 3000 | 1860 | 1315 | 1770 | 2145 |
| 2 | 15 | 10.0 | 66.5 | 850 | 245 | 160 | 440 | 640 |
| 3 | 20 | 10.2 | 68.5 | 680 | 180 | 135 | 360 | 560 |
| 4 | 30 | 10.2 | 68 | 290 | 105 | 90 | 215 | 315 |
| 5 | 50 | 12.0 | 69 | 120 | 50 | 40 | 110 | 170 |
| 6 | 80 | 10.8 | 70.5 | 10 | 10 | 10 | 20 | 30 |

TABLE II

| Fluidity Range | Slope of Curve in that Range |
|---|---|
| 0 – 5 | −135 |
| 5 – 10 | −84 |
| 10 – 15 | −45 |
| 15 – 20 ) | −20 |
| ) Break pt. on | |
| 20 – 25 ) curve | −16 |
| 25 – 30 | −12 |
| 30 – 35 | −8 |
| 35 – 40 | −6 |
| 40 – 50 | −4 |
| 50 – 60 | −4 |
| 60 – 70 | −3.5 |

TABLE II-continued

| Fluidity Range | Slope of Curve in that Range |
| --- | --- |
| 70 – 80 | −2.5 |

The total solids of the final adhesive is between about 10% and about 40% of the weight of the final adhesive mix. The viscosity of the final adhesive mix is between about 16 seconds and about 120 seconds as measured in a standard brass cup test at 105° F. The standard brass cup test is described in Preparation, Circulation, and Storage of Corrugating Adhesives, S.T.A.P. No. 3 prepared by The Technical Association of the Pulp and Paper Industry.

The percent of cooked or carrier starch solids in the final mix is between about 3% and about 12% of the final adhesive mix and preferably is above 4%. Of this, 25% to 100% is gelatinized waxy starch solids and 75% to 0% is gelatinized non-waxy starch solids. The amount of raw starch solids in the final mix is between about 10 and about 35% of the final adhesive mix.

Between about 0.01 and 1.0% by weight borax is used, based on the weight of the final adhesive mix.

The final adhesive contains about 0.01 to about 1.0% caustic (NaOH) by weight based on the weight of the adhesive.

From about 60 to about 86.9% water by weight is in the final adhesive mix.

In preparing the primary mix (as will be described in more detail in the Examples which follow), the mixing water is at about 70° F. to about 130° F. and raw corn starch, modified waxy corn starch and sodium hydroxide are added. The mix is heated to about 130° F. to about 185° F., preferably 160° F., for about 5 to about 30 minutes to gelatinize the starches. Water is added and the mix stirred for about 5 to about 15 minutes.

The secondary mix is prepared by mixing raw corn starch and borax with water. The primary mix is added to the secondary mix over a period of about 10 to about 60 minutes, preferably 30 minutes.

The final adhesive has a viscosity of about 16 seconds to about 120 seconds at 105° F.

This adhesive can be stored for up to 4 days and still be usable.

The adhesive composition can be prepared by adding an additional amount of cooked solids in the form of a gelatinized waxy starch to a standard corrugating adhesive, or by including a gelatinized waxy starch as a component in the preparation of the cooked carrier portion so as to increase the amount of cooked solids in that portion.

The following examples are set forth to illustrate methods of preparing adhesive compositions of this invention to one skilled in the art and they are not intended to be restrictive, but merely to be illustrative of the invention herein contained.

EXAMPLE 1

500 gallons of a domestic corrugating adhesive containing approximately 23% starch solids are pumped from a storage tank into the secondary mixer. In the primary mixer 70 gallons of water is heated to 120° F. and with agitation 4 pounds of borax (sodium borate pentahydrate), 300 pounds of an acid modified waxy corn starch having an alkaline fluidity of approximately 80 mls., and 6 pounds of sodium hydroxide are added in that order. This mixture is heated to 160° F. and is agitated at that temperature for 15 minutes. At the end of the 15 minutes, 50 gallons of water are added and allowed to mix 5 minutes. This mixture is slowly added over a 15 minute period to the contents of the secondary mixer (the cooked starch solids thereby being increased from 4% to 9%). The finished adhesive is mixed 15 minutes before using. It has a brass cup viscosity of 46 sec.

This adhesive was used on a commercial corrugator to produce both double-wall and triple-wall corrugated board. The components of the double-wall board were the following: 42 lb. linear-26 lbs. medium-42 lb. liner-26 lb. medium-42 lb. liner.

On this particular corrugating machine, double-wall board of this type is usually produced at a rate of about 200 ft./min. With the adhesive described in this example, this type of board is produced at rates of 350 ft./min. As an added benefit it was found that the adhesive settings of the machine (this regulates the amount of the adhesive used) could be reduced by 25%.

The components of the triple-wall board were the following: 90 lb. liner-26 lb. medium-42 lb. liner-26 lb. medium-42 lb. liner-26 lb. medium-42 lb. liner. On this particular corrugating machine, triple-wall board of this type is produced at 150 ft./min. With the adhesive described in this example, corrugated board of high quality was produced at rates of 250 ft./min.

EXAMPLE 2

In the primary mixer 154 gallons of water are heated to 120° F. and with agitation 150 pounds of pearl corn starch, 300 pounds of acid modified waxy corn starch of about 80 fluidity, and 32 pounds of sodium hydroxide are added in that order. This mixture is heated to 160° F. and is agitated at that temperature for 15 minutes. At the end of the 15 minutes, 120 gallons of water is added and is allowed to mix 10 minutes. This cooked portion is slowly added over a 30 minute period to a slurry of 340 gallons of water, 24 pounds of borax (sodium borate pentahydrate) and 1150 pounds of pearl corn starch that had been prepared in the secondary mixer. This adhesive has a brass cup viscosity of 54 seconds at 104° F.

This adhesive was used on a commercial corrugator to produce triple-wall board with the following components: 90 lb. liner-26 lb. medium-42 lb. liner-26 lb. medium-42 lb. liner-26 lb. medium-42 lb. liner. On this particular corrugating machine, triple-wall board of this type is produced at 150 ft./min. With the adhesive described in this example, this type of board is produced at rates of 250 ft./min.

A portion of this adhesive was stored for 56 hours and was then used to produce heavy weight board with the following components: 90 lb. liner-26 lb. medium-90 lb. liner. On this particular corrugator single-wall board of this type is produced at 200 ft./min. With this stored adhesive, this type of board is produced at rates of 350 ft./min. This illustrates the stability of the adhesive formulation of the present invention.

EXAMPLE 3

260 parts of water are heated to 120° F. and with agitation 1.82 parts of borax pentahydrate, 136 parts of an acid modified waxy sorghum starch having an alkaline fluidity of approximately 80, and 2.27 parts of sodium hydroxide are added in that order. This mixture is heated to 160° F. and is agitated at that temperature for 15 minutes. At the end of the 15 minutes, 189 parts of water are added and allowed to mix 5 minutes. This mixture is slowly added over a 15 minute period of 2250 parts of a standard domestic corrugating adhesive. The cooked starch solids are increased from approximately 4% to 9%.

EXAMPLE 4

260 parts of water are heated to 120° F. and with agitation 1.82 parts of borax pentahydrate, 136 parts of a hypochlorite oxidized waxy corn starch having an alkaline fluidity of approximately 80, and 2.27 parts of sodium hydroxide are added in that order. This mixture is heated to 160° F. and is agitated at that temperature for 15 minutes. At the end of the 15 minutes, 189 parts of water are added and allowed to mix 5 minutes. This mixture is slowly added over a 15 minute period of 2250 parts of a standard domestic corrugating adhesive. The cooked starch solids are increased from approximately 4% to 9%.

EXAMPLE 5

In the following example all of the parts are by weight. In the primary mixer 380 parts of water are mixed with agitation with 163 parts of 55 fluidity thin boiling waxy maize starch. 29 parts of 50% sodium hydroxide solution are added and the mixture is heated to 155°–160° F., and held with agitation for 15 minutes. At the end of the 15 minutes holding period, 238 parts of water are added and thoroughly mixed. This constitutes the primary, or cooked carrier portion, of the corrugating adhesive.

In the secondary mixer 1520 parts of water are mixed with 13.6 parts of borax (decahydrate) and 544 parts of pearl corn starch, This mixture is thoroughly agitated and constitutes the secondary or raw portion of the corrugating adhesive. To prepare the final mix the primary is added to the secondary slowly over a 30 minute period with continuous agitation. This product is useful as a commercial corrugating adhesive for multiwall or heavy weight board and increases corrugator speed substantially.

EXAMPLE 6

In a commercial corrugating plant an adhesive is made up using approximately a 30 fluidity waxy starch as 100% of the carrier portion. The adhesive is used to manufacture 200 lb. test 42 lb.-26 lb.-42 lb. board. Excellent quality board is produced at speeds of 500–600 feet/minute. This is a 20% increase in production over a regular corrugating adhesive without the waxy starch in the carrier.

The details of the adhesive formulation are as folows:
Bottom Mixer:
Step
1. Add water and heat to 140°–145° F. 240 gal.
2. Add 30 fluidity waxy carrier starch 250 lbs.
3. Add caustic soda (50% solution) 68 lbs.
4. Temp. 145°–150° F., mix 15 minutes
5. Add Borax (10 mol.) — mix 5 minutes 10 lbs.
6. Add cooling water Note: Temp. should be 105° F., reheat if necessary
7. Add pearl starch (slowly) — mix until smooth 1050 lbs.
8. Add Borax (10 mol.) — mix until smooth 20 lbs.
Finished viscosity 60 seconds at mixer
Finished volume — 700 gal.
Gel point — 142°–144° F.
Total starch solids — 20.5%
Carrier starch solids — 4.3%
Dry pin adhesion results — C flute — 55 lbs.-SF

What is claimed is:
1. A method of making multiwall thickness corrugated board at high speeds comprising the steps of
   a. preparing an adhesive mix having modified waxy starch in the carrier portion, said starch having a fluidity of about 25 to about 90 mls,
   b. applying said mix to a corrugator, and
   c. forming a multiwall board on said corrugator at a higher than normal rate of speed.
2. The method of claim 1 wherein the waxy starch constitutes about 25% to 100% of the starch in the carrier portion.
3. A method of making multiwall thickness corrugated board at high speeds comprising the steps of
   I. preparing an adhesive mix comprising
      a. 3 to 12% gelatinized starch solids of which 25 to 100% is waxy starch modified to increase the fluidity thereof to the range of 25 to about 90 mlls measured at 25° C.,
      b. 10 to 35% raw starch solids,
      c. 0.1 to 1.0% NaOH, and
      d. 60 to 86.9% water, said percent being by weight based on the final adhesive mix,
   II. applying said mix to a corrugator, and
   III. forming a multiwall board on said corrugator at a higher than normal rate of speed.
4. The process of claim 3 wherein the amount of gelatinized starch solids is such as to provide an increased amount of cooked starch solids as compared with conventional corrugating adhesives, the viscosity of said adhesive being 16 to 120 seconds on the brass cup at 105° F., and the waxy starch being modified to allow said increased amount of cooked solids while retaining the viscosity of the adhesive.
5. The composition of claim 3 in which 0.1 to 1.0% borax is present.
6. The composition of claim 3 having 10 to 40% total solids by weight.
7. The composition of claim 3 wherein the waxy starch has a solubility of 0.1 to 100% at 77° F., a viscosity of 0.2 to 2 deciliter/gram at 0.5% concentration and 77° F.

* * * * *